United States Patent [19]

Catterlain et al.

[11] Patent Number: 4,937,947

[45] Date of Patent: Jul. 3, 1990

[54] APPARATUS FOR ADJUSTING SHAFT SUPPORTS TO A REFERENCE AXIS

[75] Inventors: Camille M. Catterlain, Franconville; Françis Girard, Viroflay; Gaston H. Reide, La Garenne Colombes, all of France

[73] Assignee: Societe Anonyme Dite Hispano-Suiza, Saint-Cloud, France

[21] Appl. No.: 352,988

[22] Filed: May 17, 1989

[30] Foreign Application Priority Data

May 17, 1988 [FR] France .................... 88 06591

[51] Int. Cl.⁵ .................................................. B43L 7/06
[52] U.S. Cl. ............................................ 33/550; 33/551
[58] Field of Search .................. 82/148, 150, 151, 170, 82/903; 33/550, 551, 350, 351; 364/550, 521; 340/722, 720, 712; 341/31

[56] References Cited

U.S. PATENT DOCUMENTS

| | | | |
|---|---|---|---|
| 3,177,742 | 4/1965 | Basso | 82/1 |
| 3,212,373 | 10/1965 | Basso | 82/33 |
| 4,520,700 | 6/1985 | Herzog et al. | 82/148 |
| 4,672,364 | 6/1987 | Lucas | 340/712 |
| 4,750,141 | 6/1988 | Judell et al. | 33/550 |

Primary Examiner—Frederick R. Schmidt
Assistant Examiner—Mark F. Frazier
Attorney, Agent, or Firm—Bacon & Thomas

[57] ABSTRACT

An apparatus is disclosed to rotate a gear shaft about a reference axis and to position rolling path support elements such that their centers coincide with a reference axis. Once the rolling path elements have been centered and adjusted to compensate for any offset or warp they are fixedly attached to the gear shaft and serve to accurately support the shaft in a grinding or machining device which forms internal centering chamfers. Once the centering chamfers have been formed, they may be used to support the device during its final machining. A computer is included in the apparatus and is operatively connected to rotating and feeler devices. The computer is also operatively connected to a display screen which displays a sequence of events enabling the operator to adjust the positions of the rolling path elements. The display screen may include infrared heat sensitive areas to enable the operator to input data into the computer and control the operation of the apparatus.

6 Claims, 2 Drawing Sheets

APPARATUS FOR ADJUSTING SHAFT SUPPORTS TO A REFERENCE AXIS

BACKGROUND OF THE INVENTION

The present invention relates to a machine for adjusting gear shaft supports such that their centers coincide with a rotational reference axis.

In the process of fabricating gear shafts, such as gear wheels having a hollow shaft extending therethrough, the ends of the shafts are formed with interanl centering chambers which, in use, serve to accurately support and align the shaft and the gear. When the gear shaft is to be used in aircraft applications, the dimensional tolerances must be maintained at a very high level of accuracy.

It is typical in the formation of such devices to heat treat the gear shaft prior to its final machining. While such a heat treatment is necessary to form the device with the necessary strength, it quite often causes deformation of the shaft and/or the gear by either offsetting its rotational axis or warping the plane of the gear.

At this point in the process, it is necessary to re-establish the internal centering chamfers about a reference axis such that the reference axis can be used in the final machining of the gear shaft, including the gear teeth, any internal splines, or external bearing surfaces.

SUMMARY OF THE INVENTION

The present invention provides an apparatus to rotate the gear shaft about a reference axis and to position the rolling path support elements such that their centers coincide with the reference axis. Once the rolling path elements have been centered and adjusted to compensate for any offset or warp, they are fixed attached to the gear shaft and serve to accurately support the shaft in a grinding or machining device which finish machines the internal centering chamfers. Once the centering chamfers have been formed, they may be used to support the device during its final machining.

The apparatus according to the invention has elements to rotatably support the gear shaft and rolling path elements and a device to rotate them about a reference axis. The apparatus also includes a test gear wheel which may be roatably supported on the apparatus so as to engage the teeth of the gear on the gear shaft.

Arms mounted on the support device contact peripheries of the rolling path elements at two circumferentially displaced pressure points. Pressure tips are also included to urge the rolling path elements into contact with the pressure shoes. Feelers are also mounted on the apparatus to measure th offset and warp of the gear shaft.

A computer is included in the apparatus and is operatively connected to the rotating and feeler devices. The computer is also operatively connected to a display screen which displays a sequence of events enabling the operator to adjust the positions of the rolling path elements. The display screen may include infrared heat sensitive areas to enable the operator to input data into the computer and control the operation of the apparatus merely by touching the screen.

DETAILED DESCRIPTION OF THE PREFERRED EMBODIMENT

Figure 1:
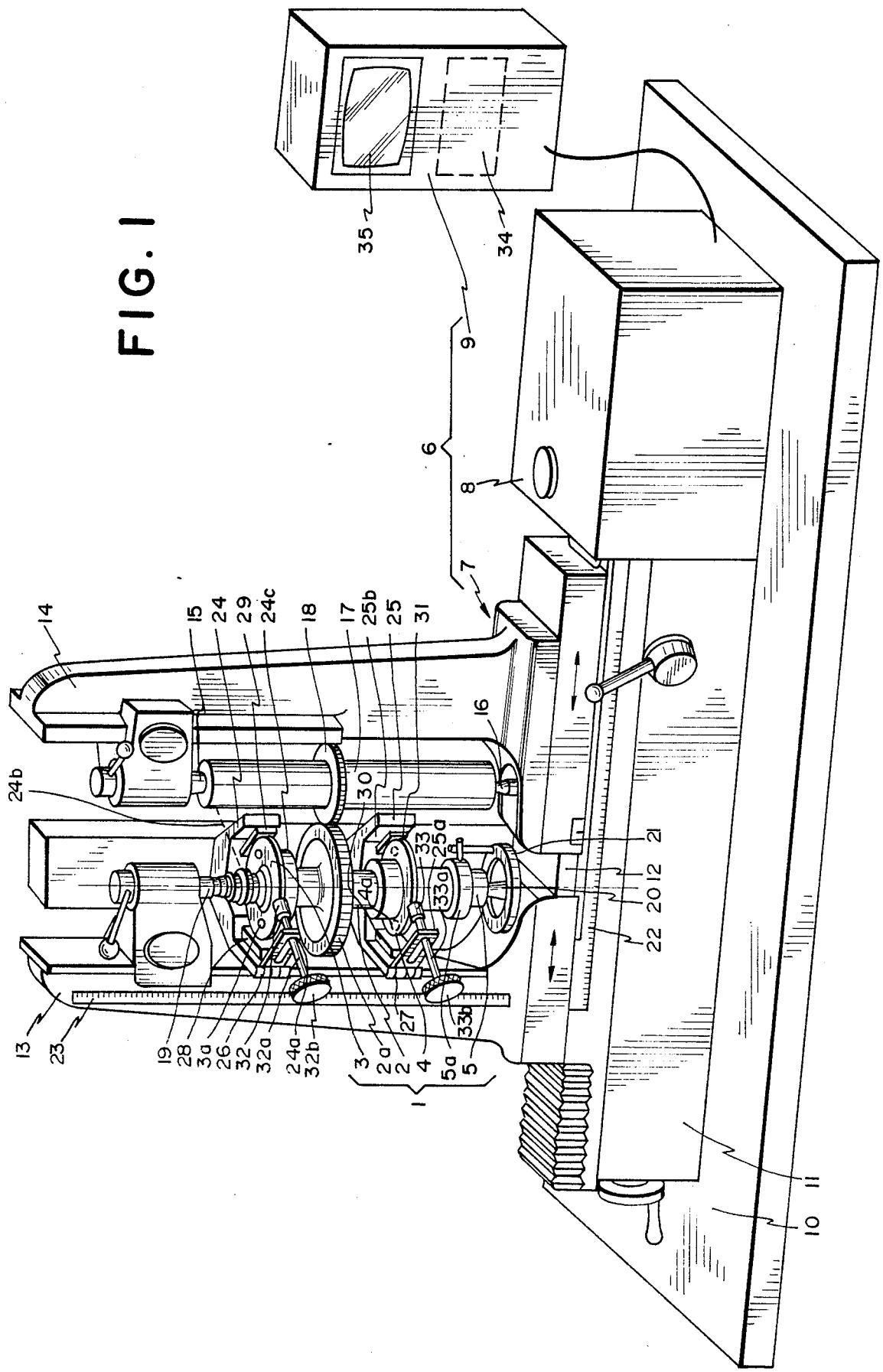
FIG. 1 is a perspective view of the apparatus according to the invention.

The apparatus according to the invention is shown in FIG. 1 and comprises an assembly 1 of a gear shaft 2 on which the internal centering chamfers must be finish machined. The gear shaft is adjustably attached to rolling path elements 3 and 4 and is supported on mandrel 5. The details of the rolling path element, the mandrel and their attachments to the gear shaft 2 are described in detail in applicant's co-pending application entitled, "Method and Apparatus Forming Matching Centering Chamfers", filed concurrently herewith. As noted therein, mandrel 5 is equipped with drive means 5a which engages corresponding drive means formed on the apparatus such that the entire assembly, which is rotatably supported between centering spindles 19 and 20, may be rotated about a reference axis.

The apparatus 6 for adjusting the rolling path elements 3 and 4 relative to the gear shaft 2 comprises an electro-mechanical sub-assembly 7, a connection chassis 8, and a control portion 9. The electro-mechanical sub-assembly 7 includes a machine frame 10 having a base 11 provided with, in known manner, guilding slides 12 which slidably support a support post 13. The gear shaft/mandrel assembly is rotatably supported on support post 13 by centering spindles 19 and 20.

The apparatus also includes spindles 15 and 16 which roatatably support a jig 17 having a standard gear 18 mounted thereon. The standard gear 18 is adapted to mesh with the gear teeth 2a of the gear shaft 2.

Centering spindle 20 is associated with drive plate 21 which, in turn, cooperates with drive means 5a formed on the mandrel 5 so as to rotate the assembly about the reference axis. The drive plate 21 is connected in known fashion to a drive motor which is controlled through the connection chassis 8 by the control portion 9. Vernier adjusting scales 22 and 23 may also be included on both the support post 13 and the base 11 to accurately position the various elements of the device.

An upper arm 24 and a lower arm 25 are attached to the support post 13, each having position indicating pointers 26 and 27 cooperating with vernier scale 23. Each of the arms 24 and 25 cooperates with the respective rolling path elements 3 and 4. Each of the arms has two pressure shoes, pressure shoes 28 and 29 being associated with arm 24 while pressure shoes 30 and 31 are associated with arm 25. Each pair of pressure shoes is mounted symmetrically relative to the axis of rotation of the gear shaft and may be extended or retracted to bear against the peripheries of the respective rolling path elements.

Pressure tips 32 and 33 are supported on rods 32a and 33a, respectively, which may be rotated by control knobs 32b and 33b. The support rods 32a and 32b, respectively, are supported by mounts 24a and 25a joined to the corresponding arms 24 or 25. The mounts 24a and 25a are capable of pivoting motion so as to bear against the respective rolling path elements 3 or 4 such that the rolling path elements may be moved in a plane extending generally perpendicular to the rotational axis. This enables the positions of the rolling path elements 3 or 4 to be adjusted such that their centers coincide with the reference axis.

Feelers 24b and 25b are mounted on the respective arms 24 and 25, and are connected to the control portion 9 for sensing the positions of the resepctive rolling path elements 3 and 4. Feeler 24c is positioned so as to check for the warp of the gear plane relative to the axis of rotation. Feeler 24c is also connected to the control portion 9 through the classic 8.

The control means of control portion 9 includes computer 34 that is operatively associated with the chassis 8 as well as with touch-control display screen 35. The display screen 35 may comprise a plurality of elements that are sensitive to infrared heat and are capable of initiating an electrical signal when the operators finger is applied to the display screen.

The screen 35, through the computer 34, displays consecutive tabulations of the program sequence associted with the computer 34 while simultaneously enabling the operator to input data and instruction commands. The screen 35 also displays the offset and warp of the gear shaft as determined by the feelers associated with arms 24 and 25.

Figure 2:
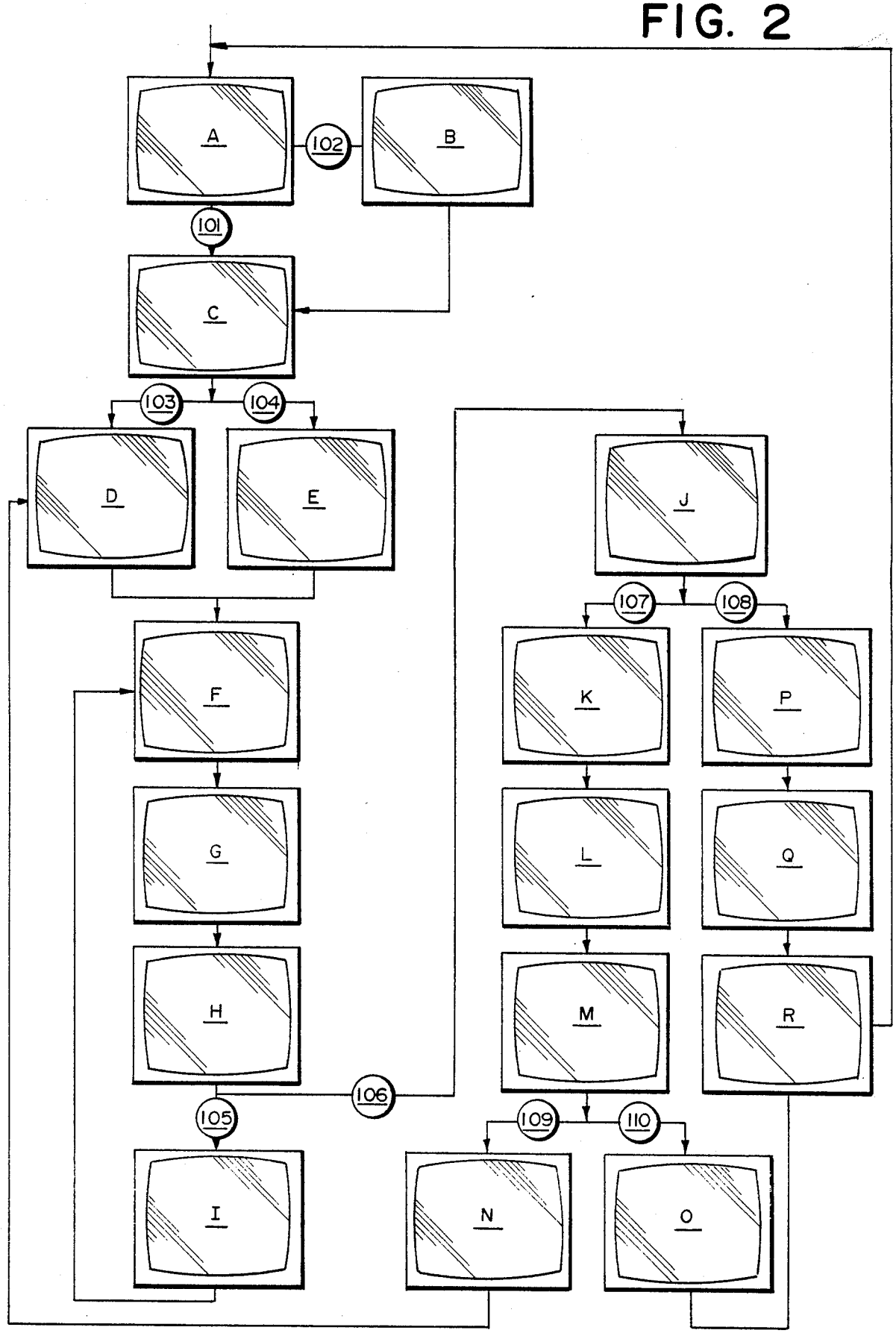
FIG. 2 is a schematic diagram showing the display sequence presented on the display screen of the apparatus.

A sequential flow chart is illustrated in FIG. 2 indicating the sequence of the display appearing on screen 35. At display A, the operator inputs data regarding the identification of the gear shaft 2, such as an alpha-numeric identification number. If the identification corresponds to a known gear shaft as determined by a comparison with the databank of the computer 34, the display proceeds along path 101 to display C. If there is no known gear shaft part, path 102 leads to display B enabling the operator to input data regarding the gear shaft. If the logic proceeds along path 103, the next subsequent display D or along path 104 to display E depending on whether or not the input databank has identified the information regarding the gear shaft.

Subsequent displays F, G and H tell the operator which adjustments to carry out on the machine 6 to place the pressure shoes 28, 29, 30 and 31 on the rolling path elements 3 and 4. The program sequence is carried out by the confirmation of the operator that each step has been completed by touching of the screen 35.

Following such adjustment, if the determined offset is equal to or exceeds a predetermined threshold value $S_1$, the logic proceeds along path 105 to display I which then transmits a new display sequence corresponding to F, G and H of the adjustments to be made. If the determined and displayed offsets are less than the threshold value, path 106 leads to display J which contains information relating to the eccentricity of the gear shaft relative to the reference axis. If the value relative to the reference axis are within a predetermined tolerance, the logic proceeds along path 107 to subsequence displays K, L and M. These displays correspond to the displacement of the rolling path elements 3 and 4 by the pressure tips 32 and 33 while obtained values are monitored on screen 35 as well as data relating to the pressure tips 32 and 33 being moved away from the rolling path element as well as the retraction of pressure shoes 28, 29, 30 and 31.

Logic path 109 is followed if the defects notes are beyond the tolerances as shown on display N. If such is the case, the display returns to display D to readjust the elements. If the adjustments were satisfactory following display M, path 110 leads to display O which indicates the end of the adjustment of the gear shaft on the macahine 6.

Following display J, logic path 108 leads to displays P and Q if the eccentricity value relative to the reference axis exceeds the predetermined tolerance. Display P and Q will also display the end of the operation if it is impossible to adjust the eccentricities to be within the predetermined tolerances. Display R indicates the end of the display sequence and a return to the initial display A.

The foregoing description is provided for illustrative purposes only and should not be construed as in any way limiting this invention, the scope of which is defined solely by the appended claims.

What is claimed is:

1. Apparatus for adjusting lateral positions of a plurality of rolling path elements each having a center and attached to a gear shaft such that the centers coincide with a reference axis comprising:
   (a) means to support the gear shaft and rolling path elements;
   (b) means to rotate the gear shaft about an axis;
   (c) a plurality of arms on the support means, each having a pair of pressure shoes adapted to bear against a periphery of a rolling path element at circumferentially displaced points;
   (d) pressure tips located on each arm and acting on a rolling path element to urge it into contact with the pressure shoes;
   (e) control means operatively connected to the means to rotate the gear shaft comprising;
      (i) a computer operatively connected to the means to rotate the gear shaft ; and,
      (ii) display and input command means operatively connected to the computer to visually display on a touch sensitive screen a program sequence for the consecutive adjustment stages for adjusting the position of the rolling path element wherein the input command is achieved by touching the screen at the desired portion of the program sequence display; and,
   (f) feeler means located on each arm so as to bear against the respective rolling path element and connected to the control means to provide input relating to the positions of the rolling path elements.

2. The apparatus to claim 1 wherein the touch sensitive input command comprises an infrared heat sensitive element on the display screen activated by the touch of the operator's finger.

3. The apparatus according to claim 2 wherein the program sequence comprises:
   (a) at least one display for inputing at least one alpha-numeric identification code identifying the gear shaft;
   (b) a plurality of subsequent displays for adjusting on the machine the rolling path and for a positioning procedure;
   (c) a subsequent display which restarts the displays of (b) in the event that the detected offset exceeds a predetermined value;
   (d) a plurality of subsequent displays corresponding to the operators displacement of the rolling path element if the detected offset is less than the predetermined value;
   (e) a subsequent display to return the sequence to display (b) if a check of the defect magnitudes exceed predetermined values;
   (f) a display subsequent to display (d) if a check of the defect magnitudes is less than predetermined values corresponding to disassembling the pinion; and (g) a final display resetting the program sequence to display (a).

4. The apparatus according to claim 1 further comprising:
   (a) mounting brackets having a pressure tip attached thereto; and
   (b) means pivotally attaching a mounting bracket to each arm.

5. The apparatus according to claim 4 further comprising means to adjustable attach the pressure tip to a mounting bracket such that the position of the tip with respect to the mounting bracket may be adjusted.

6. The apparatus according to claim 1 further comprising second feeler means located so as to contact a gear attached to the gear shaft and connected to the control mens to provide input relating to the warp of the gear.

* * * * *

UNITED STATES PATENT AND TRADEMARK OFFICE
CERTIFICATE OF CORRECTION

PATENT NO. : 4,937,947
DATED : July 3, 1990
INVENTOR(S) : Catterlain et al.

It is certified that error appears in the above-identified patent and that said Letters Patent is hereby corrected as shown below:

Column 1, line 12, "interanl" should be --internal--;
          line 13, "chambers" should be --chamfers--;
          line 36, "fixed" should be --fixedly--;
          line 53, "th" should be --the--.

Column 2, line 15, "Matching" should be --Machining--.

Column 3, line 7, "classic" should be --chassis--;
          line 13, "operators" should be --operator's--;
          line 52, "subsequence" should be --subsequent--;
          line 55, after "while" should be --the--;
          line 60, "notes" should be --noted--;
          line 65, "macahine" should be --machine--.

Column 4, line 1, "Display" should be --Displays--;
          line 44, after "apparatus" should be --according--.

Column 6, line 2, "adjustable" should be --adjustably--;
          line 8, "mens" should be --means--.

Signed and Sealed this

Twelfth Day of May, 1992

Attest:

DOUGLAS B. COMER

*Attesting Officer*      *Acting Commissioner of Patents and Trademarks*

UNITED STATES PATENT AND TRADEMARK OFFICE
CERTIFICATE OF CORRECTION

PATENT NO. : 4,937,947

DATED : July 3, 1990

INVENTOR(S) : CATTELAIN

It is certified that error appears in the above-identified patent and that said Letters Patent is hereby corrected as shown below:

On the title page, under item [19] and in item [75]:

Inventors name should be "CATTELAIN" not "CATTERLAIN"

Signed and Sealed this

Sixteenth Day of March, 1993

Attest:

STEPHEN G. KUNIN

*Attesting Officer*　　　*Acting Commissioner of Patents and Trademarks*